(12) United States Patent
Hirukawa

(10) Patent No.: US 7,431,014 B2
(45) Date of Patent: Oct. 7, 2008

(54) INTERNAL COMBUSTION ENGINE AND VEHICLE HAVING THE SAME

(75) Inventor: Itsushi Hirukawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 5 days.

(21) Appl. No.: 11/536,214

(22) Filed: Sep. 28, 2006

(65) Prior Publication Data

US 2008/0078360 A1     Apr. 3, 2008

(51) Int. Cl.
*F02P 5/145* (2006.01)
*F02P 11/02* (2006.01)

(52) U.S. Cl. .................... 123/406.57; 123/631

(58) Field of Classification Search ................ 123/406.23–406.27, 406.57, 631
See application file for complete search history.

(56) References Cited

U.S. PATENT DOCUMENTS

| | | | | |
|---|---|---|---|---|
| 6,584,957 B2 * | 7/2003 | Iwata et al. | ............ | 123/406.57 |
| 6,761,148 B2 * | 7/2004 | Kiessling | ............... | 123/406.57 |
| 6,973,911 B2 * | 12/2005 | Yamashita | ............. | 123/406.57 |
| 7,047,956 B2 * | 5/2006 | Masaoka et al. | ............ | 123/631 |

FOREIGN PATENT DOCUMENTS

| | | | |
|---|---|---|---|
| JP | 60-187766 A | 9/1985 | |
| JP | 2002-221138 A | 8/2002 | |
| JP | 2006274998 A | * 10/2006 | ............ 123/406.57 |

* cited by examiner

*Primary Examiner*—Willis R Wolfe, Jr.
(74) *Attorney, Agent, or Firm*—Keating & Bennett, LLP

(57) ABSTRACT

An internal combustion engine performs an ignition timing control by an electronic control in accordance with a pulse signal from a pulser. The pulser generates a plurality of the pulser signals per one rotation of the internal combustion engine. An ignition timing control system calculates a reduction amount of a rotational speed of the internal combustion engine based on a plurality of the pulse signals immediately before performing an ignition in the internal combustion engine to determine whether the reduction amount produces ignition combustion kickback and performs a hard ignition or an ignition at an angle which is delayed more than the hard ignition.

16 Claims, 17 Drawing Sheets

INTERNAL COMBUSTION ENGINE AND VEHICLE HAVING THE SAME

BACKGROUND OF THE INVENTION

1. Field of the Invention

The present invention relates to an internal combustion engine and a vehicle including the same. More particularly, the present invention relates to an internal combustion engine used in a riding type vehicle (for example, motorcycle) which prevents kickback from occurring.

2. Description of the Related Art

In a motorcycle, a phenomenon referred to as "kickback" (refer to, for example, JP-A-60-187766 and JP-A-2002-221138) occurs. As described in JP-A-60-187766 and JP-A-2002-221138, "kickback" is a phenomenon in which when starting an engine (internal combustion engine), ignition by an ignition plug occurs immediately before an upper dead center of a piston, the piston is pushed back before reaching the upper dead center by an explosion force thereof, and the engine is caused to rotate reversely and to abruptly stop.

According to JP-A-60-187766, in order to prevent kickback, an engine starting apparatus is described which prohibits operation of an ignition apparatus until an engine reaches a predetermined rotational speed. Furthermore, in JP-A-2002-221138, an engine starting apparatus suitable for a motorcycle is disclosed which includes an engine automatic stopping and starting apparatus which is stopped in response to a predetermined stopping condition when a vehicle is running and restarted in response to a predetermined starting operation after being stopped.

When kickback occurs, a large reverse rotating torque is produced in a power transmission system between a crankshaft and a starter motor. In order to prevent a component of a starter system (for example, one way clutch, starter motor or the like) from being damaged by the reverse rotating torque, a torque limiter or other suitable device is used as a countermeasure. However, such a countermeasure increases the cost and/or weight, which is a problem, particularly in a motorcycle.

Although starting apparatuses capable of preventing kickback are disclosed in JP-A-60-187766 and JP-A-2002-221138, it is known that kickback occurs at times other than during starting, and it is preferable to provide a countermeasure against kickback so as to securely prevent kickback at times other than during starting. Further, although in JP-A-60-187766 and JP-A-2002-221138, when kickback is anticipated to occur, kickback is prevented by stopping the ignition. However, stopping the ignition produces an unnatural, strange feeling to a rider.

SUMMARY OF THE INVENTION

To overcome the problems described above, preferred embodiments of the present invention provide an internal combustion engine capable of effectively preventing kickback not only during starting, but also at all other times of rotation.

An internal combustion engine according to a preferred embodiment of the present invention provides an internal combustion engine for performing an ignition timing control by an electronic control to provide a previously determined ignition timing in accordance with a pulse signal from a pulser, wherein the pulser generates a plurality of the pulse signals per one rotation of the internal combustion engine, the internal combustion engine including an ignition timing control system for calculating a reduction amount of a rotational speed of the internal combustion engine by the plurality of pulse signals immediately before performing an ignition at the previously determined ignition timing in the internal combustion engine to determine whether the reduction amount produces ignition combustion kickback and performing a hard ignition or an ignition at an angle which is delayed more than the hard ignition based on the determination. Here, the previously determined ignition timing can be determined by an average rotational speed of one rotation of the internal combustion engine. Furthermore, the determination may be performed by an average rotational speed of a plurality of rotations of the internal combustion engine.

In a preferred embodiment of the present invention, the ignition timing control system includes a control apparatus connected to the pulser for calculating the reduction amount of the rotational speed, and an ignition apparatus which is connected to the control apparatus and the ignition timing of which is controlled by the control apparatus, wherein the control apparatus is provided with a function of calculating the reduction amount of the rotational speed and determining whether the reduction amount of the rotational speed produces the ignition combustion kickback.

In a preferred embodiment of the present invention, the ignition timing control system determines whether the reduction in the rotational speed produces the ignition combustion kickback, recognizing a low or high degree to which the ignition combustion kickback is produced, executing the hard ignition when the degree is recognized to be low, and executing the delay angle ignition when the degree is recognized to be high.

The ignition timing control system preferably further includes a function of performing ignition stopping when the degree to which the ignition combustion kickback is produced is recognized to be high even during the delay angle ignition.

According to another preferred embodiment of the present invention, an internal combustion engine is provided for performing an ignition timing control by an electronic control to provide a previously determined ignition timing in accordance with a pulse signal from a pulser, wherein the pulser generates a plurality of the pulse signals per one rotation of the internal combustion engine, the internal combustion engine including an ignition timing control system for calculating a rotational speed of the internal combustion engine by a plurality of the pulse signals immediately before performing an ignition at the previously determined ignition timing in the internal combustion engine, determining whether when the rotational speed is less than a constant value, the rotational speed produces ignition combustion kickback, and performing a hard ignition or a delayed angle ignition based on the determination.

In a preferred embodiment of the present invention, the ignition timing control system includes a control apparatus connected to the pulser for calculating the rotational speed of the internal combustion engine and determining whether a value of the rotational speed is less than the constant value, and an ignition apparatus which is connected to the control apparatus and the ignition timing of which is controlled by the control apparatus, wherein the control apparatus is provided with a function of determining whether when the value of the rotational speed is less than the constant value, the value produces the ignition combustion kickback.

According to another preferred embodiment of the present invention, an internal combustion engine is provided for performing an ignition timing control by an electronic control to provide a previously determined ignition timing in accordance with a pulse signal from a pulser, wherein the pulser generates a plurality of the pulse signals per one rotation of the internal combustion engine, the internal combustion engine including an ignition timing control system for controlling the occurrence of ignition combustion kickback by calculating a reduction amount of a rotational speed of the internal combustion engine by a plurality of the pulse signals immediately before performing an ignition at the previously determined ignition timing in the internal combustion engine, wherein the ignition timing control system performs an ignition at an angle which is delayed more than the ignition of the internal combustion engine immediately therebefore in accordance with a level of the reduction amount of the rotational speed.

In a preferred embodiment of the present invention, the delayed angle ignition preferably includes a hard ignition and an ignition at an angle which is delayed more than the hard ignition.

The ignition timing control system may be further provided with a function of performing ignition stopping.

The ignition timing control system according to preferred embodiments of the present invention is preferably operated in all rotation regions of the internal combustion engine to thereby control occurrences of the ignition combustion kickback.

It is preferable that the internal combustion engine according to various preferred embodiments of the present invention is an internal combustion engine for a riding type vehicle.

A vehicle according to another preferred embodiment of the present invention is a vehicle including the internal combustion engine.

According to the internal combustion engine of various preferred embodiments of the invention, the pulser generates the plurality of pulse signal per one rotation of the internal combustion engine, the ignition timing control system calculates the reduction amount of the rotational speed of the internal combustion engine by the plurality of pulse signals immediately before performing the ignition in the internal combustion engine to determine whether the reduction amount produces the ignition combustion kickback, the hard ignition or the ignition at the angle which is delayed more than the hard ignition is performed based on the determination, and therefore, the kickback is effectively prevented without using the method of ignition stopping, and the kickback is effectively prevented not only during starting but also in all of the rotation regions. As a result, a kickback countermeasure member (i.e., a torque limiter or other suitable device) for restraining the kickback is omitted, thereby, a reducing cost and weight.

The ignition timing control system according to preferred embodiments of the present invention preferably includes the control apparatus connected to the pulser for calculating the reduction amount of the rotational speed, and the ignition apparatus which is connected to the control apparatus and the ignition timing of which is controlled by the control apparatus. The control apparatus is provided with the function of calculating the reduction amount of the rotational speed and determining whether the reduction amount of the rotational speed produces the ignition combustion kickback.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 2A through 2C designate graphs showing a relationship between a throttle opening degree and time. Furthermore, FIGS. 2a through 2c designate graphs showing a relationship between an engine rotational speed and time in correspondence with (A) through (C).

DETAILED DESCRIPTION OF PREFERRED EMBODIMENTS

The inventors of the present application have searched for a mechanism for preventing kickback in order to develop a riding type vehicle (i.e., motorcycle, four wheel buggy or other suitable vehicle) having a reduced cost and weight by omitting a member for preventing kickback from an internal combustion engine, while still effectively preventing kickback, and as a result, discovered a method of effectively preventing kickback.

Before explaining a preferred embodiment of the present invention, a simple explanation will be provided of a mechanism of producing kickback which has been investigated by the inventors.

Figure 1:
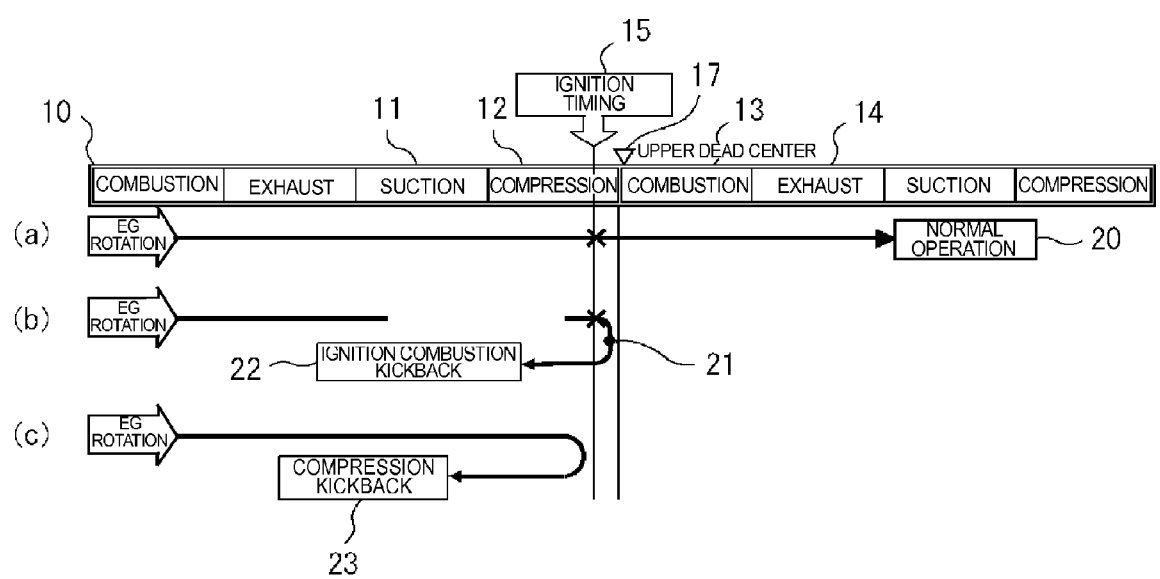
FIG. 1 is a diagram for explaining the situation in which kickback occurs.

First, as shown by FIG. 1, an internal combustion engine (reciprocal engine) is moved by repeating a stroke system 10 including a suction stroke 11, a compression stroke 12, a combustion stroke 13, and an exhaust stroke 14. An ignition timing 15 which is a timing for generating electric spark at a plug is normally set before an upper dead center 17 (at an angle advanced from the upper dead center 17). This is because when a spark is generated at the plug, a mixture in a cylinder is not combusted instantaneously, and combustion of the mixture occurs at a slightly later time. Therefore, so as to match a timing which generates a maximum pressure by sufficiently combusting the mixture at a position slightly past the upper dead center 17 from the piston, the ignition timing 15 is disposed before the upper dead center 17.

During the engine rotation (EG rotation) in FIG. 1A, an example of a normal operation 20 is shown by performing ignition at the ignition timing 15. On the other hand, during the engine rotation in FIG. 1B, although the mixture is ignited and combusted at the ignition timing 15, the piston cannot rotate past the upper dead center 17 (refer to notation 21), the engine is reversely rotated, and ignition combustion kickback 22 occurs. Furthermore, during the engine rotation in FIG. 1C, compression kickback 23 also occurs in which the engine is reversely rotated without ignition and combustion and without reaching the ignition timing 15.

Although in JP-A-60-187766 and JP-A-2002-221138 mentioned above, it is described that kickback occurs during starting, kickback also occurs at time other than during starting, for example, in a snap stall. An explanation will be given by an example of a stall when a rotational speed of the engine is increased by performing a snap used in snap racing.

Figure 2:
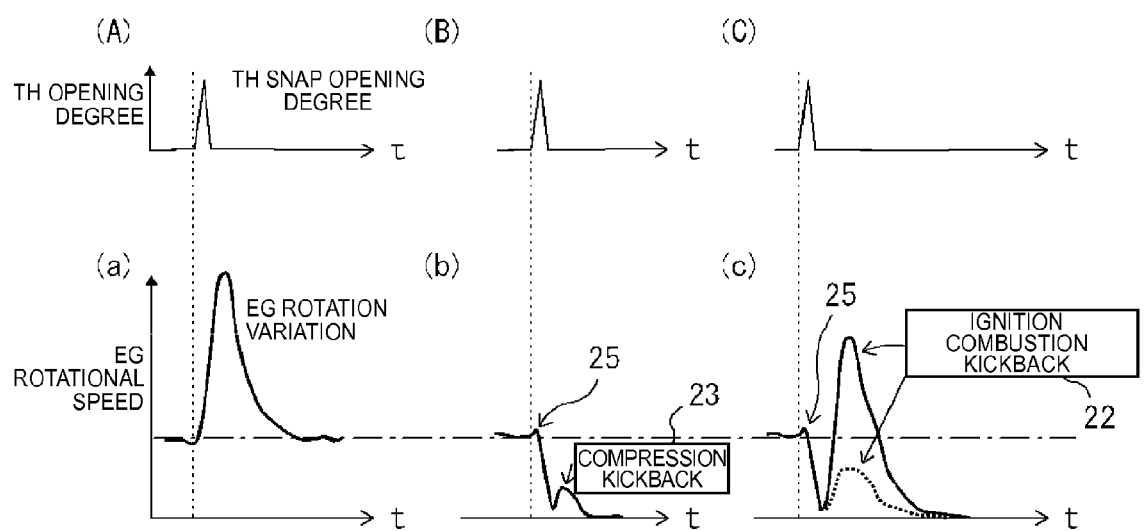
FIGS. 2A-2C and 2a-2c illustrate graphs for explaining the occurrence of kickback during snap stall.

FIGS. 2A and 2a show a state in snap racing without a stall. FIG. 2A is a graph designating a throttle snap opening degree by the ordinate and designating time by the abscissa, on the other hand, FIG. 2a is a graph designating an engine rotational speed by the ordinate and designating time by the abscissa.

As shown by FIGS. 2A and 2a, when the throttle opening degree is increased, the engine rotational speed is increased in correspondence therewith, and when the throttle opening degree is reduced, the engine rotational speed is reduced in correspondence therewith.

FIGS. 2B and 2b show a state in which compression kickback occurs during a snap stall. The graphs of FIGS. 2B and 2b correspond to the graphs of FIGS. 2A and 2a. In this case, a stall 25 occurs when the engine rotational speed is going to be increased in snap. Here, the stall 25 produces a reverse rotation behavior caused by compression kickback 23.

On the other hand, FIGS. 2C and 2c show a state in which ignition combustion engine kickback occurs in a snap stall. The graphs of FIGS. 2C and 2c correspond to the graphs of FIGS. 2A and 2a and FIGS. 2B and 2b. In this case, the stall 25 occurs when the engine rotational speed is going to be increased in a snap, and the stall 25 produces a reverse rotation behavior caused by ignition combustion kickback 22. In ignition combustion kickback 22, two patterns of an increase in reverse rotation equal to or greater than about 2000 rpm (bold line) and an increase in reverse rotation in a vicinity of about 1000 rpm (dotted line) are observed.

Although here, compression kickback observed in FIG. 2b is harmless since the reverse rotation energy (reverse rotation torque) is small, ignition combustion kickback observed in FIG. 2c is harmful since the reverse rotation energy (reverse rotation torque) is very large. That is, it is necessary to provide a countermeasure of using a torque limiter or other suitable device in order to prevent the ignition combustion kickback.

Although it is known that kickback is likely to occur when idling is low or combustion is unstable, an explanation will be given here of a mechanism that causes kickback (particularly, ignition combustion kickback) during a snap stall with reference to FIG. 3 and FIGS. 4A through 4D.

Figure 3:
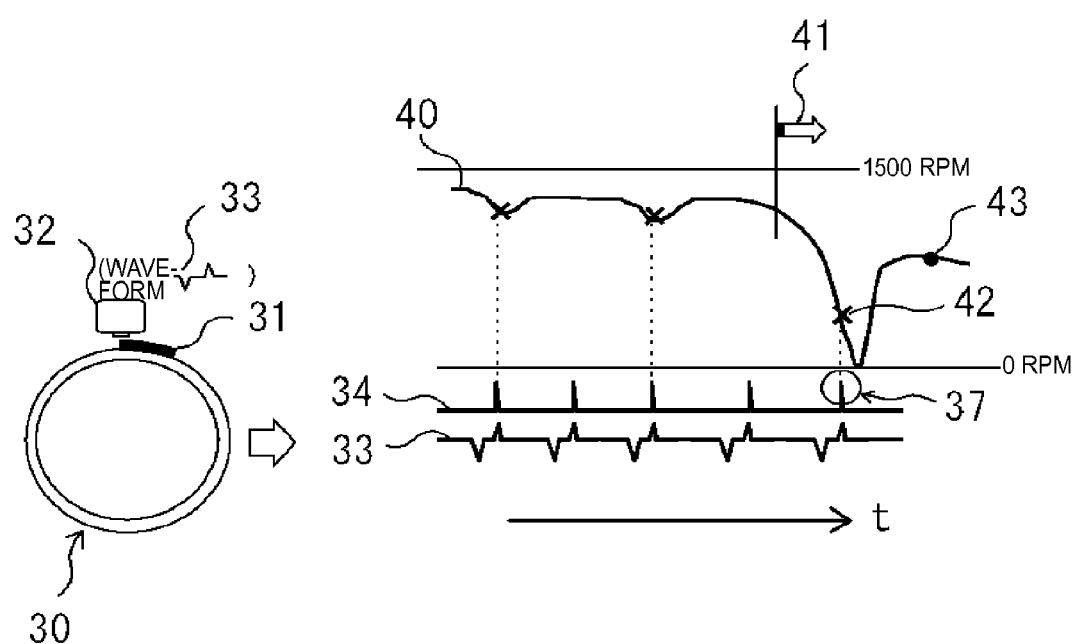
FIG. 3 is a view for explaining the situation in which kickback occurs during snap stall.

FIG. 3 shows an ignition waveform 34, a pulser waveform 33, and an engine rotation behavior 40. In FIG. 3, the pulser waveform 33 is produced by a projection 31 of an AC generator 30 and a pulser 32, and the ignition waveform 34 is determined in accordance with the pulser waveform 33. When the throttle is abruptly opened at a certain point in time (notation 41), the engine rotational speed is reduced, and reverse rotational behavior (ignition combustion kickback) 43 is produced by the ignition 37(42).

The behavior will be explained with reference to the stroke diagrams of FIGS. 4A through 4D.

First, as shown by FIG. 4A, at a stage at which an engine 50 begins a compression stroke from a suction stroke, the throttle is opened at a low rotation region, and the suction air amount is increased. That is, when the throttle is abruptly opened, suction air is increased.

Next, as shown by FIG. 4B, when the engine 50 is brought into the compression stroke (before closing suction), the suction air amount is increased, and therefore, high compression is produced. Explaining further, at low rotation, inertia energy is low and therefore, a reduction in a rotational speed 52 is increased in the compression stroke.

Next, as shown by FIG. 4C, when the reduction in the rotational speed 52 in the engine 50 becomes excessively large, the engine 50 will have difficulty rotating over the upper dead center. That is, although the inertia moment for rotating over the upper dead center is small, the engine 50 is in high compression and the rotational speed is relatively slow. When the engine is ignited and combusted at this point in time (for example, BTDC 12°; BTDC is abbreviation of Before Top Dead Center), the pressure is increased in one motion.

Then, as shown by FIG. 4D, the engine cannot rotate over the upper dead center and reverse rotation 53 is produced. That is, if the engine is ignited and combusted when the engine is having difficulty rotating over the upper dead center, the piston is pushed back so as to cause reverse rotation 53, and as a result, excessively large kickback torque is produced. Furthermore, soon after reverse rotation, a suction valve 54 is opened and therefore, combustion gas is exhausted to a suction path. At this time, when a flammable mixture is ignited, explosive combustion is produced, which can produce a loud explosive sound (backfire) 55.

Figure 5:
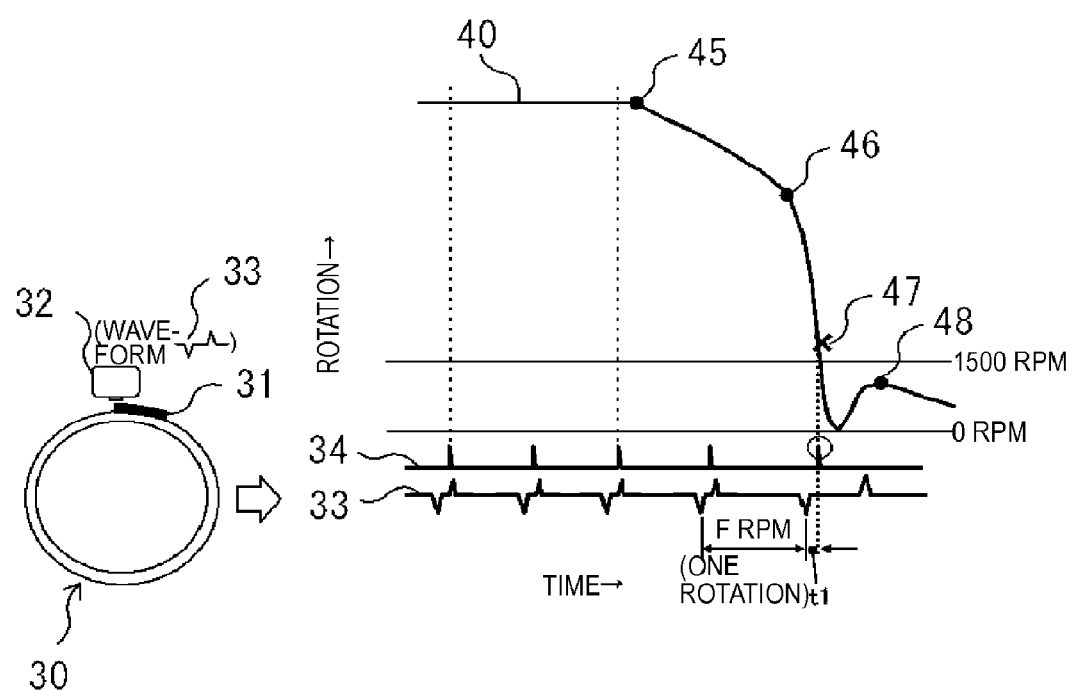
FIG. 5 is a view for a situation in which kickback occurs during start stall.

Ignition combustion kickback is also produced during a starting stall, in addition to during a snap stall. An explanation will be given thereof with reference to FIG. 5. A starting stall frequently occurs when an unskilled rider is operating a vehicle. Furthermore, an explanation of the pulser 32 and the pulser waveform 33 is similar to that of FIG. 3.

First, starting is conducted in a semi-clutched state by increasing the rotational speed (point 45). However, the clutch is connected in one motion in the middle of a procedure and engine rotation is abruptly reduced (point 46). At this point, a signal of ignition 47 has already been generated at t1 seconds thereafter from F rpm (relatively high rotation); the ignition timing is earlier than that in an idling state (that is, an advance angle state).

At this stage (point 47), ignition is performed at a considerably low rotational speed. When misfired, engine stall is produced, when the engine is ignited and combusted, a torque of the crank for rotating over the upper dead center is extremely low, and therefore, reverse rotation occurs (refer to FIG. 4(D)). Thereby, ignition combustion kickback 48 is produced. Furthermore, when the engine is rotated reversely, the suction valve is immediately opened, and therefore, a backfire may be produced for a similar reason as described above.

The mechanism that produces ignition combustion kickback can be determined by observing engine rotation behavior, pulser waveform, ignition waveform, and engine regular or reverse rotation signal in a snap stall operation or a start stall operation with a data collecting and analyzing apparatus (or analyzing apparatus) and analyzing the phenomenon. Furthermore, it has been determined by the analysis that ignition combustion kickback can be effectively prevented by adjusting the amount that the ignition timing is delayed, and further, whether ignition stopping is required. Through this analysis and discovery, various preferred embodiments of the present invention have been conceived.

Figure 6:
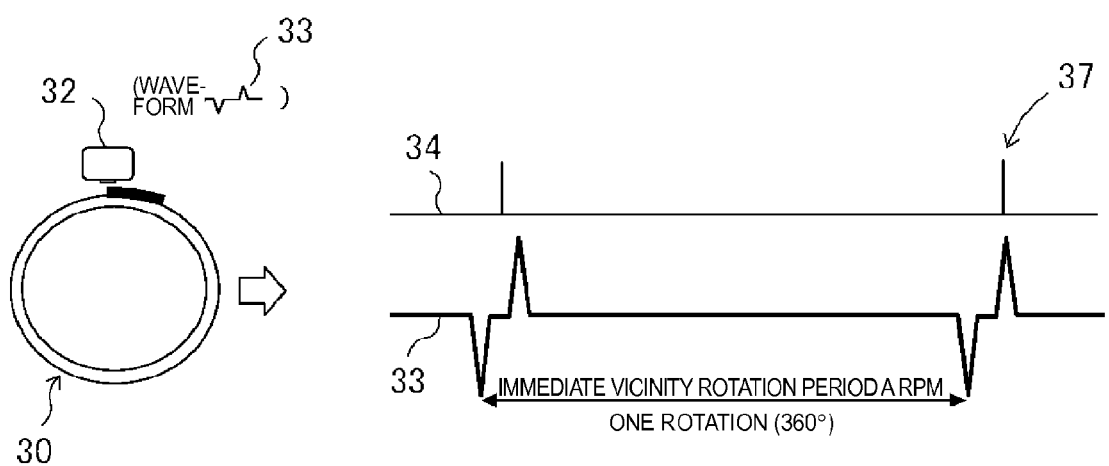
FIG. 6 is a view for explaining the operation of another kickback restraining system.
Figure 7:
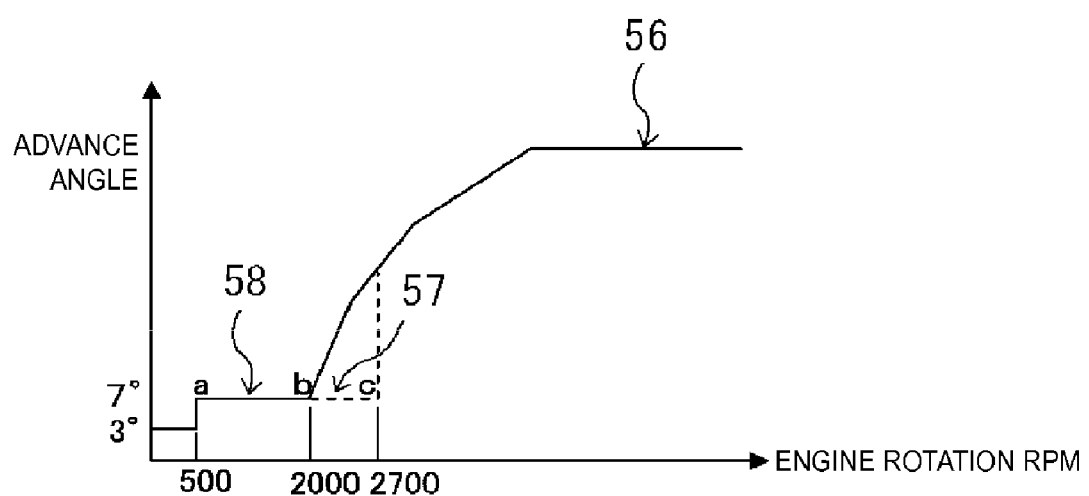
FIG. 7 is a graph for explaining the operation of another kickback restraining system.

With reference to FIG. 6 and FIG. 7, an explanation will be given of a kickback restraining system devised before performing the analysis. First, in FIG. 6, a rotational period A rpm of an immediate vicinity is calculated by the pulse waveform, when A rpm is about 2700 rpm and a throttle opening degree is equal to or less than about 48%, an ignition pulse 37 is controlled to provide a hard ignition. That is, in a graph of the engine rotation and advance angle shown in FIG. 7, the advance angle characteristic 56 is reduced in accordance with a reduction in engine rotation (bold line), although a hard ignition region is normally defined by a region of a through b (58) (in this example, about 500 rpm to about 2000 rpm), when the above-described condition is provided, a hard ignition is performed even at a rotation region of b through c (57) (that is, about 2000 rpm to about 2700 rpm).

Thereby, the ignition timing is delayed in the region of b to c, and therefore, it is difficult to produce ignition combustion kickback. However, although in the case of the immediate vicinity of A rpm, there is a situation in which when determining whether ignition combustion kickback is produced, A rpm is remote. In order to resolve this problem, when A rpm is increased further, that is, when A rpm has a value exceeding about 2700 rpm, although ignition combustion kickback can be further prevented, an acceleration response is deteriorated. In order to ensure the acceleration response, rotation is to be set such that ignition combustion kickback is produced to some degree, and in that case, an ignition combustion kickback cannot be completely prevented.

A preferred embodiment according to the present invention will be described with reference to the drawings. Further, the present invention is not limited to the following preferred embodiments.

Figure 8:
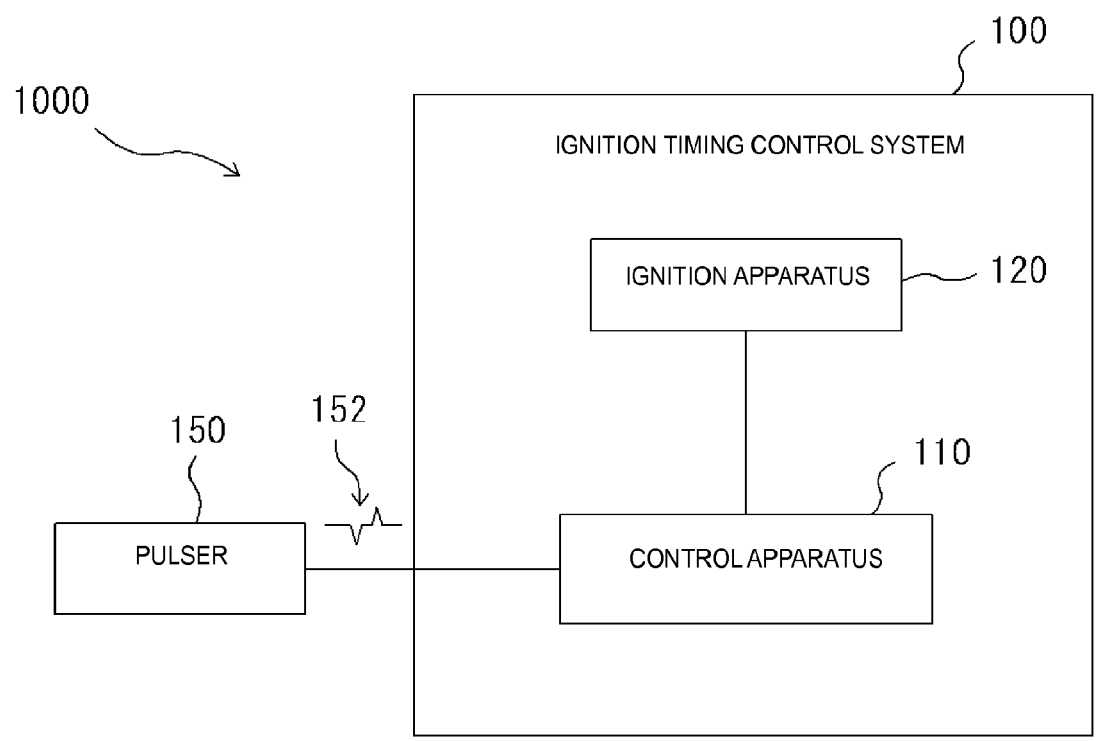
FIG. 8 is a block diagram showing an internal combustion engine according to a preferred embodiment of the present invention.

An internal combustion engine according to a preferred embodiment of the present invention is preferably an internal combustion engine 1000 for performing an ignition timing control using an electronic control in accordance with a pulse signal 152 from a pulser 150 as shown by a block diagram of FIG. 8. Described in further detail, the internal combustion engine is an internal combustion engine 1000 for performing the ignition timing control by the electronic control to provide a previously determined ignition timing in accordance with the pulse signal 152 from the pulser 150. Here, the previously determined ignition timing is determined by an average rotational speed of one rotation of the internal combustion engine. Furthermore, the previously determined ignition timing may be determined by an average rotational speed of a plurality of rotations of the internal combustion engine.

The pulser 150 according to the present preferred embodiment generates a plurality of the pulse signals 152 per one rotation of the internal combustion engine. The internal combustion engine 1000 according to the present preferred embodiment includes an ignition timing control system 100 for calculating a reduction amount of a rotational speed of the internal combustion engine by a plurality of the pulse signals (152) immediately before performing ignition at the previously determined ignition timing in the internal combustion engine (ignition at "point d" in FIG. 9, described below) to determine whether the ignition will produce ignition combustion kickback, and performing a hard ignition or a delay angle ignition rather than a hard ignition based on the determination.

The ignition timing control system 100 according to the present preferred embodiment includes a control apparatus 110 connected to the pulser 150 for calculating the reduction amount of the rotational speed, and an ignition apparatus 120 whose ignition timing is controlled by the control apparatus 110. The control apparatus 110 is provided with a function of calculating the reduction amount of the rotational speed and determining whether the reduction amount of the rotational speed will produce ignition combustion kickback.

The operation of the ignition timing control system 100 will be described in further detail with reference to FIG. 9.

Figure 9:
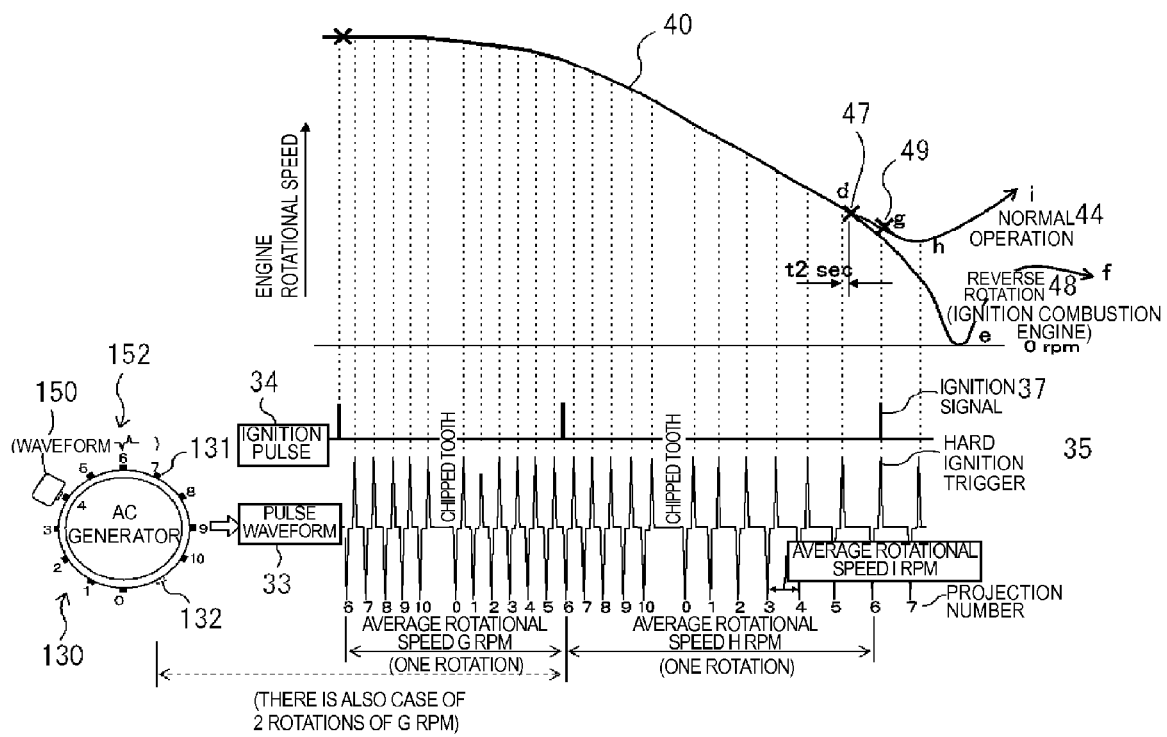
FIG. 9 is a view for explaining the operation of an ignition timing control system according to a preferred embodiment of the present invention.

FIG. 9 shows an engine rotation behavior 40 at a start stall at which ignition combustion kickback is likely to be produced, a pulser waveform 33, and an ignition pulse 34 in parallel. The engine rotation behavior 40 of a 4-cycle single cylinder is shown.

The pulser waveform 33 is produced by the pulse signal 152 from the pulser 150, and the pulser 150 is combined with an AC generator 130. The AC generator 130 is provided with a plurality of projections 131, a member including the plurality of projections 131 is arranged coaxially with a crankshaft of the engine and is rotated along with the crankshaft of the engine. Furthermore, the pulser 150 generates a plurality of the pulser signals 152 per one rotation of the internal combustion engine due to the plurality of projections 131. According to the example, the projections 131 are provided every 30° and are numbered from 0-th to 10-th, and the projection 131 corresponding to 11-th number is a skipped tooth 132.

Here, an explanation will be given of a normal operation before the operation of preventing ignition combustion kickback. In the normal operation, an ignition signal 37 determines a successive ignition timing from an average rotational speed G rpm and throttle opening degree data (not illustrated). The determination is performed by assuming that the average rotational speed and the throttle opening degree remain unchanged in a successive ignition stroke. The average rotational speed G rpm can be determined by two rotations.

In this example, the ignition signal 37 is determined to be generated t2 seconds after the pulse signal 152 produced by the 5-th projection. Further, during starting, engine rotation is increased, an opening amount of the throttle is also increased, and therefore, an advanced angle amount is increased. Further, the advance angle amount can be determined from a table of the engine rotation (rpm) and the throttle opening degree (°) which is previously and separately provided.

When clutch engagement during starting is excessively early, the reduction in engine rotation is increased. In the example shown in FIG. 9, the average rotational speed becomes H rpm.

When the ignition timing control system 100 of the preferred embodiment is not provided, the ignition timing (time) has already been determined, and therefore, ignition is performed while disregarding the rotation reduction (ignition at point d indicated by notation 47 in FIG. 9). In other words, the ignition signal 37 t2 seconds after the pulse signal 152 produced by the 5-th projection defines the ignition at the previously determined timing ("d point").

Then, in addition to the fact that an inertial force is reduced by the large rotation reduction (refer to FIG. 4C), ignition combustion caused by an excessively early ignition timing determined by high rotation provides a large reversely rotating torque, and finally, reverse rotation 48 is produced. That is, in FIG. 9, the engine rotation behavior 40 d→e→f (rotation e through f designate reverse rotation behavior) is produced. As a result, ignition combustion kickback occurs.

On the other hand, when the ignition timing control system 100 of the present preferred embodiment is provided, the engine rotation behavior 40 is controlled as follows. Although in the case of the previously determined ignition timing (point d), the ignition timing is determined by using the 5-th projection as a reference, in an illustrated example according to the preferred embodiment, from a rotational speed calculated by pulser signals caused by 3-rd projection and 4-th projection immediately therebefore, the ignition timing is determined by the control apparatus (110) (hard ignition, or ignition having a further delay angle). Therefore, the rotational speed is calculated after inputting the pulser produced by 4-th projection, and the control apparatus predicts whether ignition combustion kickback occurs, when it is predicted such that "ignition combustion kickback is produced", the ignition timing is delayed and ignition combustion kickback is prevented from occurring. According to the present preferred embodiment, "rotation reduction amount" is utilized to predict whether ignition combustion kickback occurs.

First, successive ignition timing is determined from the average rotational speed G rpm and throttle opening degree data. In the example shown in FIG. 9, the timing from the 5-th projection to the generation of the ignition signal 37 is determined. Further, similar to the above-described case, the rotation is increased and the throttle is substantially opened during starting, and therefore, the advance angle amount is relatively large. Furthermore, when clutch engagement during starting occurs excessively early, the reduction amount of rotation is increased, and therefore, in the illustrated example, the average rotational speed becomes H rpm.

According to the present preferred embodiment, a necessary average rotational speed I rpm between the projections proximate to the ignition timing is measured. Here, when a difference between G rpm and I rpm is greater than a previously determined value, the ignition timing is adjusted so as to be delayed. According to the present preferred embodiment, the predetermined value is defined by G×J %, and by setting J %, the ignition timing is adjusted. Here, for example, the ignition timing is changed to a hard ignition, or an ignition that is delayed from the hard ignition. Furthermore, it is preferable to set the J value after confirming that ignition combustion kickback does not occur in an actual machine.

In the example shown in FIG. 9, the ignition timing is changed to a point g that is delayed from point d (notation 49), thereby, ignition combustion kickback is prevented. Point g designates a hard ignition position, and ignition is performed by an ignition signal 37 in compliance with a hard point trigger 35 caused by the 6-th projection. Furthermore, as a result of restraining ignition combustion kickback from occurring, the engine rotation behavior 40 progresses from g→h→i and the engine behavior corresponds to normal operation 44.

In addition, although according to the present preferred embodiment, as the previously determined ignition timing (point d), the ignition timing is determined using the 5-th projection as a reference point, and the ignition timing is determined by the control apparatus 110 from the rotational speed calculated by the pulser signals caused by the 3-rd and 4-th projections immediately therebefore (a hard ignition, or an ignition having a delay angle). It is noted that the phrase "immediately therebefore" is not limited to only one projection before the 5-th projection, which defines the previously determined reference point of the ignition timing, but rather, "immediately therebefore" means a timing before the previously determined ignition timing (point d), and it is sufficient that the "immediately therebefore" is a timing that is capable of predicting a rotational speed which is a value proximate to a rotational speed at the ignition timing when the rotational speed is reduced during a time period of rotating the crankshaft by one rotation. Not only one projection therebefore, but also two projections therebefore, three projections therebefore, and any other suitable number of projections therebefore may define "immediately therebefore" in accordance with a total number of the projections.

Next, an explanation will be given of an example of a flow chart of the ignition timing control system for preventing ignition combustion kickback according to the present preferred embodiment with reference to FIGS. 10A and 10B. The system is described with respect to an engine having an MAX rotational speed of about 8000 rpm.

Figure 10A:
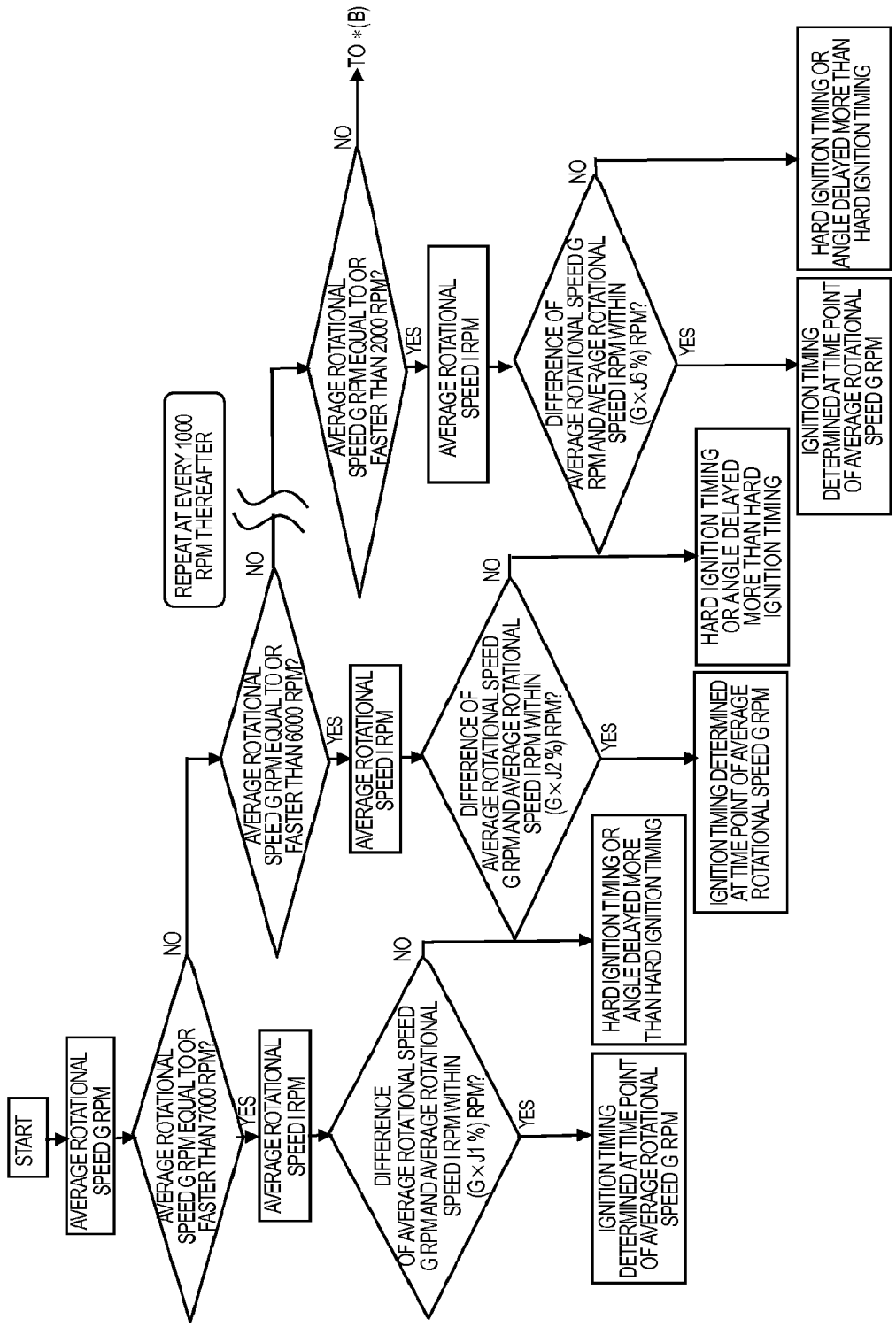
FIGS. 10A and 10B are flow charts with respect to the ignition timing control system.

Beginning from the start step in FIG. 10A, the average rotational speed G rpm is measured, and it is determined whether the average rotational speed G rpm is equal to or greater than about 7000 rpm. If "YES", the average rotational speed I rpm is measured, and it is determined whether a difference between the average rotational speed G rpm and the average rotational speed I rpm is within (G×J1%) rpm. Furthermore, the determinations are performed by the control apparatus 110 shown in FIG. 8. Notation "J1" designates a rate of rotation reduction when engine rotation is equal to or greater than about 7000 rpm, and according to the present preferred embodiment, a rate selected by an actual machine test is used.

When the determination is "YES", the ignition timing determined at a time point of the average rotational speed G rpm is performed. That is, soft ignition at an angle which is more advanced than the timing of a hard ignition is successively performed. When the determination is "NO", ignition is performed at a hard ignition timing, or a timing at an angle which is more delayed than the hard ignition timing, thereby, ignition combustion kickback is prevented from occurring.

Furthermore, when the determination whether the average rotational speed G rpm is equal to or greater than about 7000 rpm is "NO", the operation shifts to a right on the flow chart shown in FIG. 10A, and a process similar to that of the above-described flow chart is performed. That is, it is determined whether the average rotational speed G rpm is equal to or greater than about 6000 rpm, in the case of "YES", the average rotational speed I rpm is measured, and it is determined whether a difference between the average rotational speed G rpm and the average rotational speed I rpm is within (G×J2%) rpm. Notation "J2" designates a rate of rotation reduction when engine rotation is equal to or greater than about 6000 rpm, and a rate selected by the actual machine test is used. When the determination is "YES", an ignition timing determined at a time point of the average rotational speed G rpm is performed. On the other hand, in the case of "NO", ignition is performed at a hard ignition timing, or at a timing at an angle which is delayed more than a hard ignition timing.

When the determination whether the average rotational speed G rpm is equal or greater than about 6000 rpm is "NO", the operation shifts further right on the flow chart shown in FIG. 10A, and similar processes are performed thereafter at 1000 rpm intervals. Further, it is determined whether the average rotational speed G rpm is equal or greater than about 2000 rpm, and if the determination is "YES", a similar process is performed using "J6" which is a rate of rotation reduction when engine rotation is equal to or greater than about 2000 rpm.

Figure 10B:
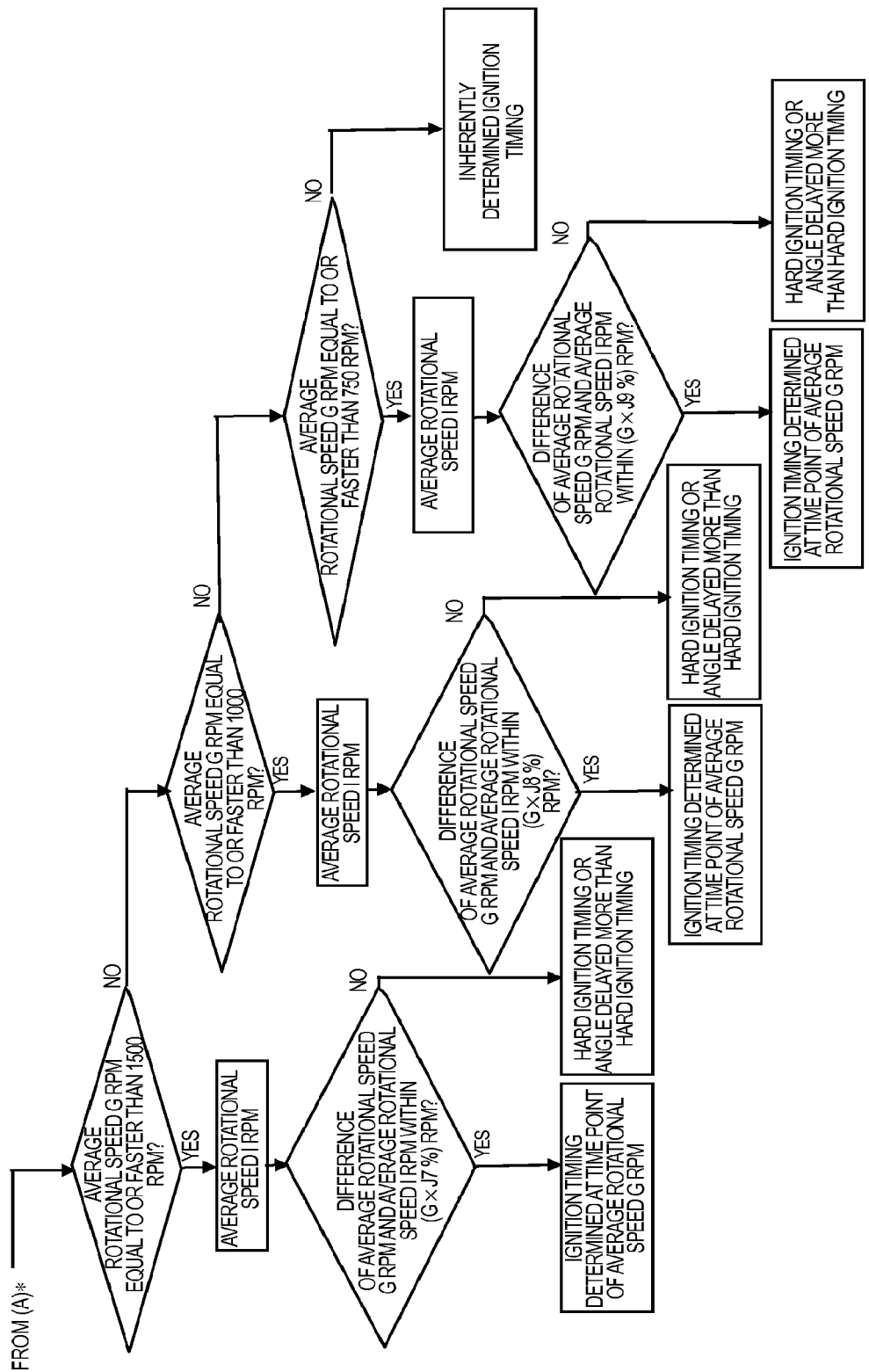

Next, the operation is shifted to FIG. 10B. As shown in the FIG. 10B, a determination whether the average rotational speed G rpm is equal to or greater than about 1500 rpm and a flow process thereafter, a determination whether the average rotational speed G rpm is equal to or greater than about 1000 rpm and a flow process thereafter, a determination whether the average rotational speed G rpm is equal to or greater than about 750 rpm and a flow process thereafter are continued. When the average rotational speed G rpm is not equal to or greater than about 750 rpm, ignition is performed by an inherently determined ignition timing (for example, a hard ignition timing). Here, "J7", "J8", "J9" are respective rates of rotation reduction when engine rotation is equal to or greater than about 1500 rpm, equal to or greater than about 1000 rpm, equal to or greater than about 750 rpm, and rates selected by the actual machine test are used.

Furthermore, when the MAX rotational speed differs, a dividing number of G rpm is changed. In addition, although FIG. 10A shows an example of a section of G rpm by 1000 rpm, the section may also be increased (for example, 2000 rpm intervals) or decreased (for example, 500 rpm intervals) so as to facilitate the occurrences of ignition combustion kickback.

Furthermore, although according to the ignition timing control system 100 of the present preferred embodiment, in order to restrain ignition combustion kickback from occurring, the system performs a hard ignition or an ignition at an angle that is delayed more than the hard ignition by the reduction in the rotational speed, when it is recognized that the amount of ignition combustion kickback is increased even during the delay angle ignition, ignition stopping may further be performed.

Further, although, theoretically, ignition combustion kickback is not produced when the piston exceeds the top (upper dead center), it is preferable to provide ignition stopping in consideration of an element of prediction accuracy. That is, although the ignition timing is frequently described as $X°$ before upper dead center, when the ignition timing is controlled, time is frequently used instead of the angle. Explained simply, when ignition is determined at $X°$ from a certain pulser signal, assuming that the engine is rotated at a relatively constant rotational speed, a time period to reach $X°$ is calculated, the angle is replaced by time, and the time is used. Therefore, although no problem is posed when the rotational speed remains constant, when the rotational speed is significantly reduced, the prediction becomes difficult, and therefore, when ignition stopping is also provided, the ignition timing control system can also be used where the prediction accuracy is poor. The prediction accuracy can also be improved by finely analyzing a phenomenon when the rotational speed is significantly reduced.

An explanation will be given of a method which also includes the ignition stopping with reference to FIG. 11. The start step of FIG. 11 corresponds to the start step of FIG. 10A.

Figure 11:
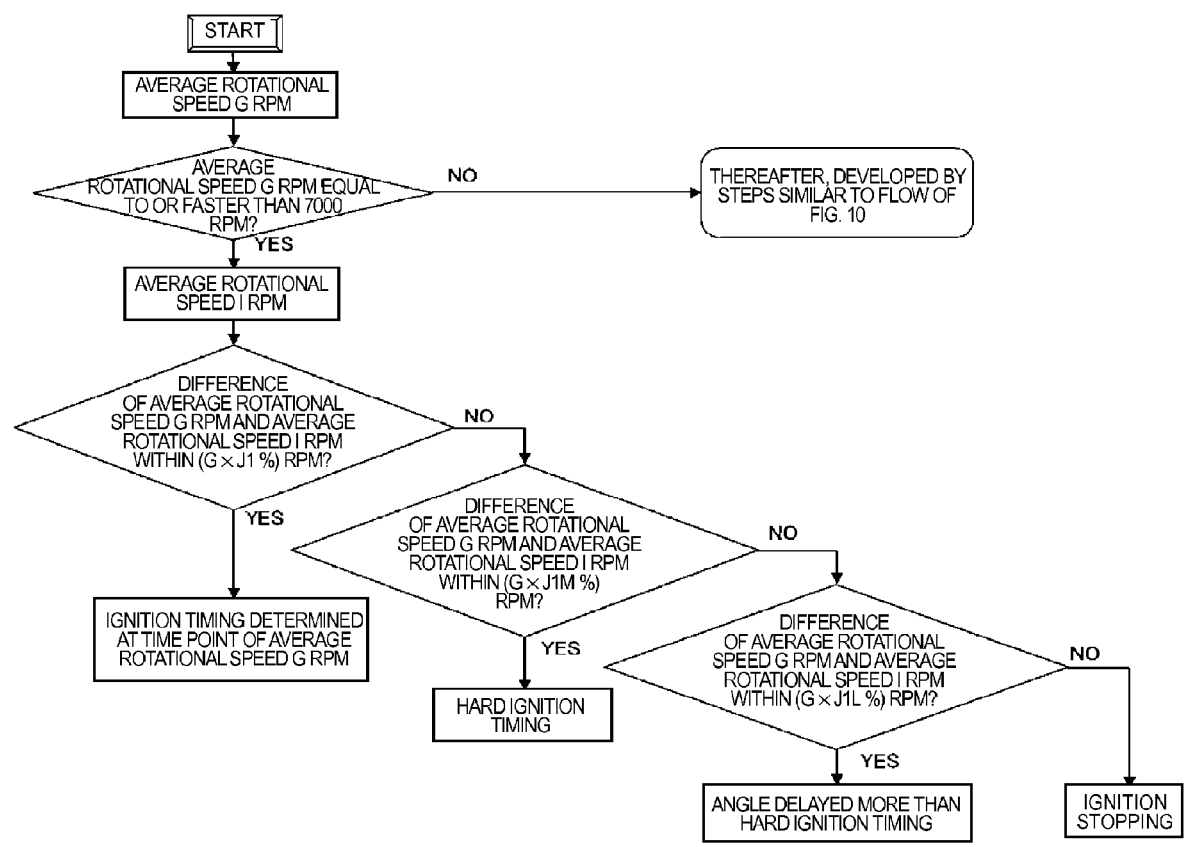
FIG. 11 is a flow chart with respect to the ignition timing control system.

After the start step of FIG. 11, similar to FIG. 10A, the average rotational speed G rpm is measured, and it is determined whether the average rotational speed G rpm is equal to or greater than about 7000 rpm. If "YES", the average rotational speed I rpm is measured, and it is determined whether the difference between the average rotational speed G rpm and the average rotational speed I rpm is within (G×J1%) rpm. Also if the determination is "YES", the ignition timing determined at the time point of the average rotational speed G rpm is performed.

On the other hand, when the determination whether the difference between G rpm and I rpm is within (G×J1%) is "NO", it is determined whether the difference between G rpm and I rpm is within (G×J1M %) rpm. Here, the notation "J1M" designates that during rotation reduction when engine rotation is equal to or greater than about 7000 rpm, a rate of reduction is to a medium degree, which is selected by the actual machine test. When the determination is "YES", ignition of a hard ignition timing is performed.

Further, when the determination is "NO", it is determined whether the difference between G rpm and I rpm is within (G×J1L %) rpm. Here, the notation "J1L" designates that during rotation reduction when engine rotation is equal to or greater than about 7000 rpm, a reduction rate is set to a large degree, which is selected by the actual machine test. If the determination is "YES", an ignition timing at an angle which is delayed more than the hard ignition timing is provided, on the other hand, in the case of "NO", the ignition is stopped.

Furthermore, when the average rotational speed G rpm is not equal to or greater than about 7000 rpm, steps similar to those of the flow chart of FIGS. 10A and 10B are used. In addition, at respective stages, steps shown in FIG. 11 can be performed.

As described above, in the internal combustion engine 1000 according to the present preferred embodiment, the pulser 150 generates a plurality of pulse signals 152 per one rotation of the internal combustion engine, the ignition timing control system 100 determines whether the ignition will produce ignition combustion kickback by calculating the reduction amount of the rotational speed of the internal combustion engine by the plurality of pulse signals 152 immediately before performing ignition in the internal combustion engine (a plurality of pulse signals per one rotation immediately therebefore in the example shown in FIG. 9). In addition, based on the determination, a hard ignition or an ignition at an angle which is delayed more than the hard ignition is performed, and therefore, ignition combustion kickback 48 is effectively prevented from occurring without using the method of ignition stopping, and ignition combustion kickback 48 is effectively prevented not only during starting, but also in all rotation regions. As a result, a kickback countermeasure member (i.e., a torque limiter or other suitable device) for restraining ignition combustion kickback 48 may be omitted, thereby, reducing the cost and weight of the internal combustion engine.

Although according to the system of the present preferred embodiment, it is predicted whether ignition combustion kickback occurs by utilizing a "rotation reduction amount", the present invention is not limited thereto, and the prediction can also be performed based on, for example, a "rotational speed (rotational number)". The method will be explained with reference to FIGS. 12A and 12B. In addition, flow charts shown in FIGS. 12A and 12B correspond to the flow charts shown in FIGS. 10A and 10B.

Figure 12A:
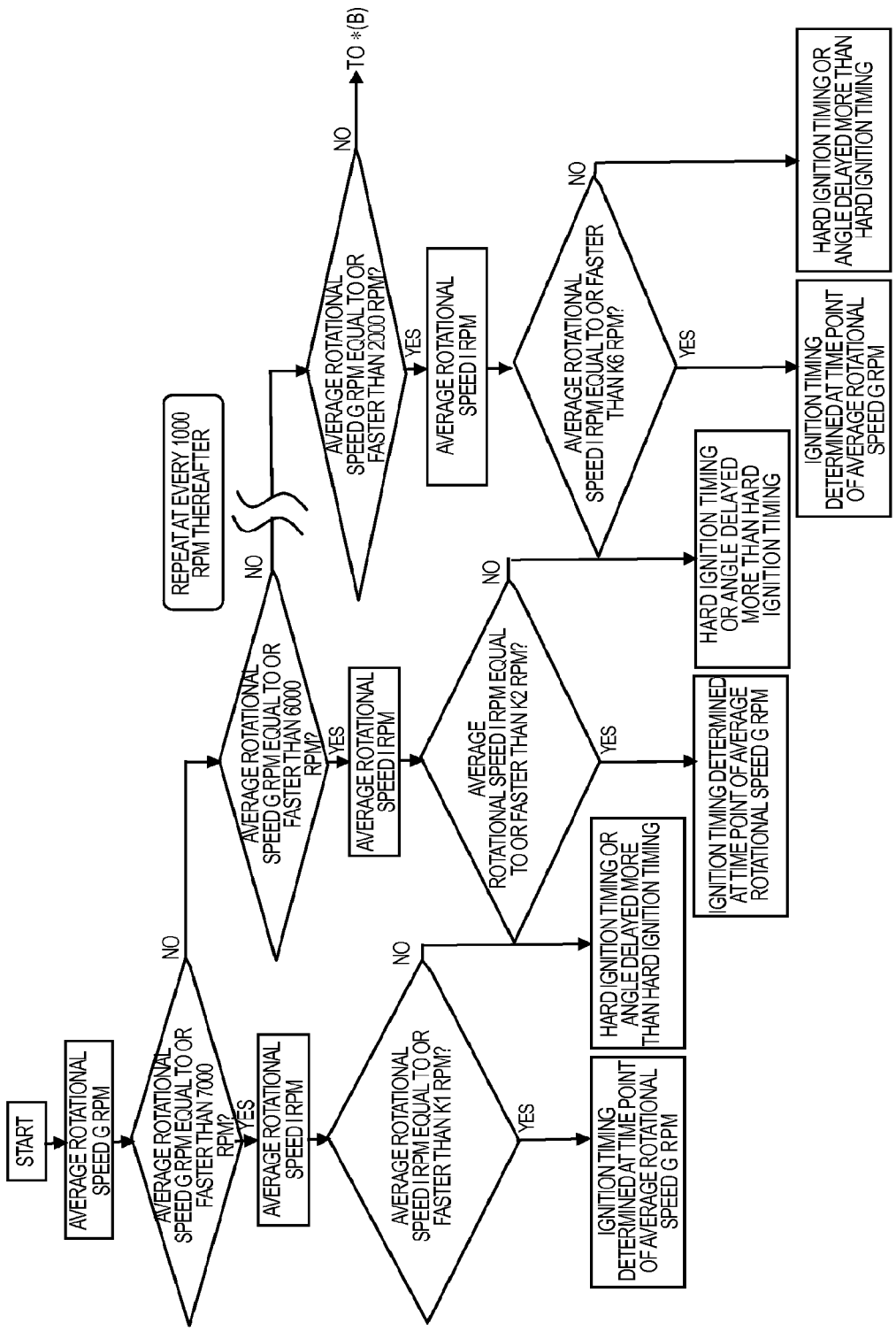
FIGS. 12A and 12B are flow charts with respect to the ignition timing control system.

After the start step of FIG. 12A, similar to FIG. 10A, the average rotational speed G rpm is measured, and it is determined whether the average rotational speed G rpm is equal to or greater than about 7000 rpm. If "YES", the average rotational speed I rpm is measured, and it is determined whether the average rotational speed I rpm is equal to or greater than K1 rpm. Here, the notation "K1" designates a reduced rotational speed when engine rotation is equal to or greater than about 7000 rpm, and according to the present preferred embodiment, a reduced rotational speed selected by the actual machine test is used.

When the determination is "YES", the ignition timing selected at the time point of the average rotational speed G rpm is performed. On the other hand, when the determination is "NO", the ignition is performed at a hard ignition timing, or, at the timing at which the angle is delayed more than the hard ignition.

Other steps are performed in a similar manner to those of FIGS. 10A and 10B, determinations are performed based on whether the average rotational speeds are equal to or greater than predetermined average rotational speeds (K2, . . . , K6, K7, K8, K9), and processing thereafter is performed. In the drawings, the notation "K2" corresponds to the reduced rotational speed when engine rotation is equal to or greater than about 6000 rpm, "K6", "K7", "K8", "K9" respectively correspond to reduced rotational speeds when engine rotation is equal to or greater than about 2000 rpm, equal to or greater than about 1500 rpm, equal to or greater than about 1000 rpm and equal to or greater than about 750 rpm.

Figure 12B:
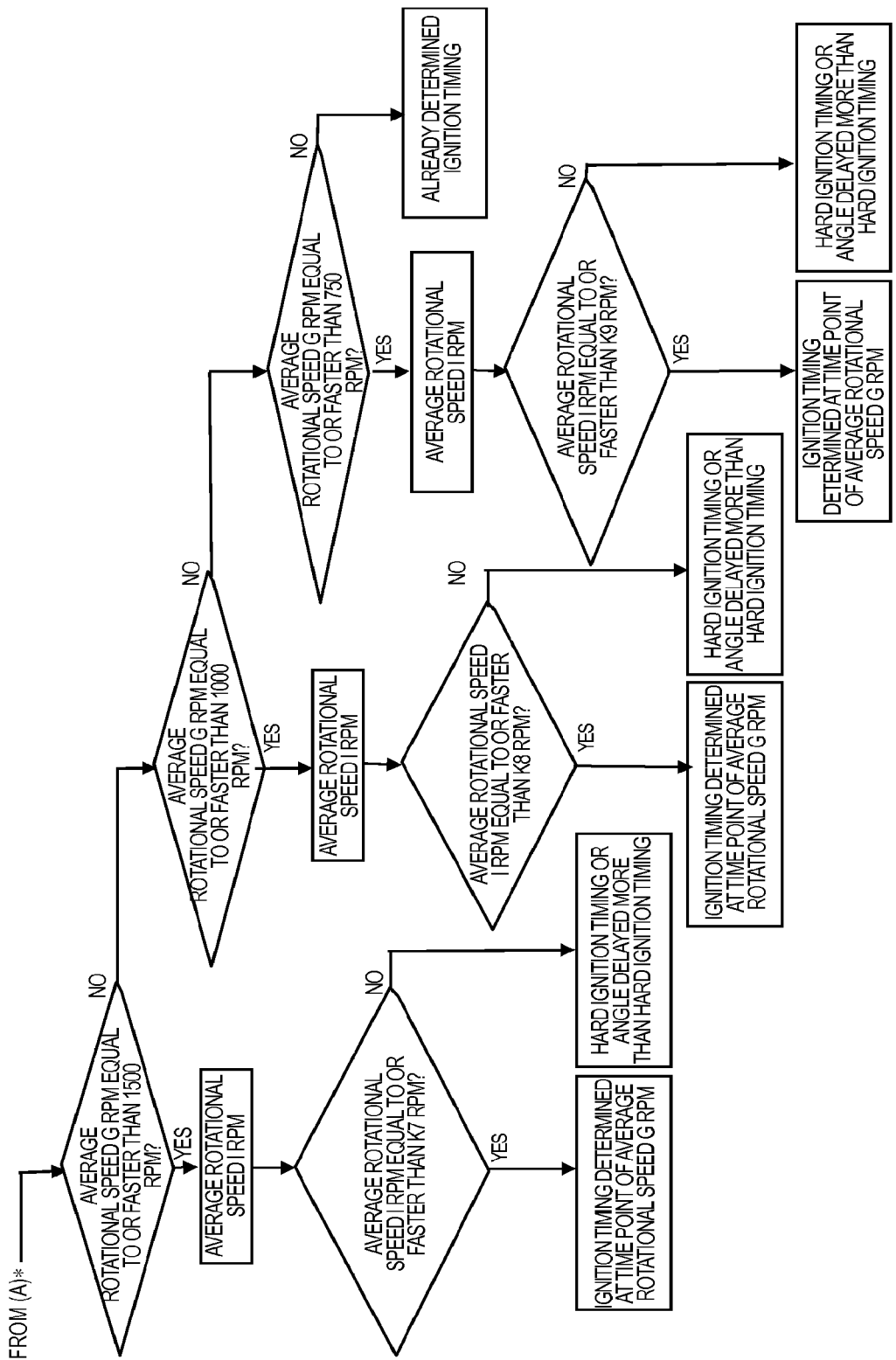

Also in the flow charts shown in FIGS. 12A and 12B, similar to the above-described flow charts, the number of dividing G rpm is changed when the MAX rotational speed differs. In addition, the number can be increased (for example, 2000 rpm interval), or reduced (for example, 500 rpm interval) so as to facilitate producing ignition combustion kickback. Further, by reducing the rotational speed, ignition stopping may also be used, in addition to performing a hard ignition, and performing the ignition at an the angle which is delayed more than the hard ignition.

Figure 13:
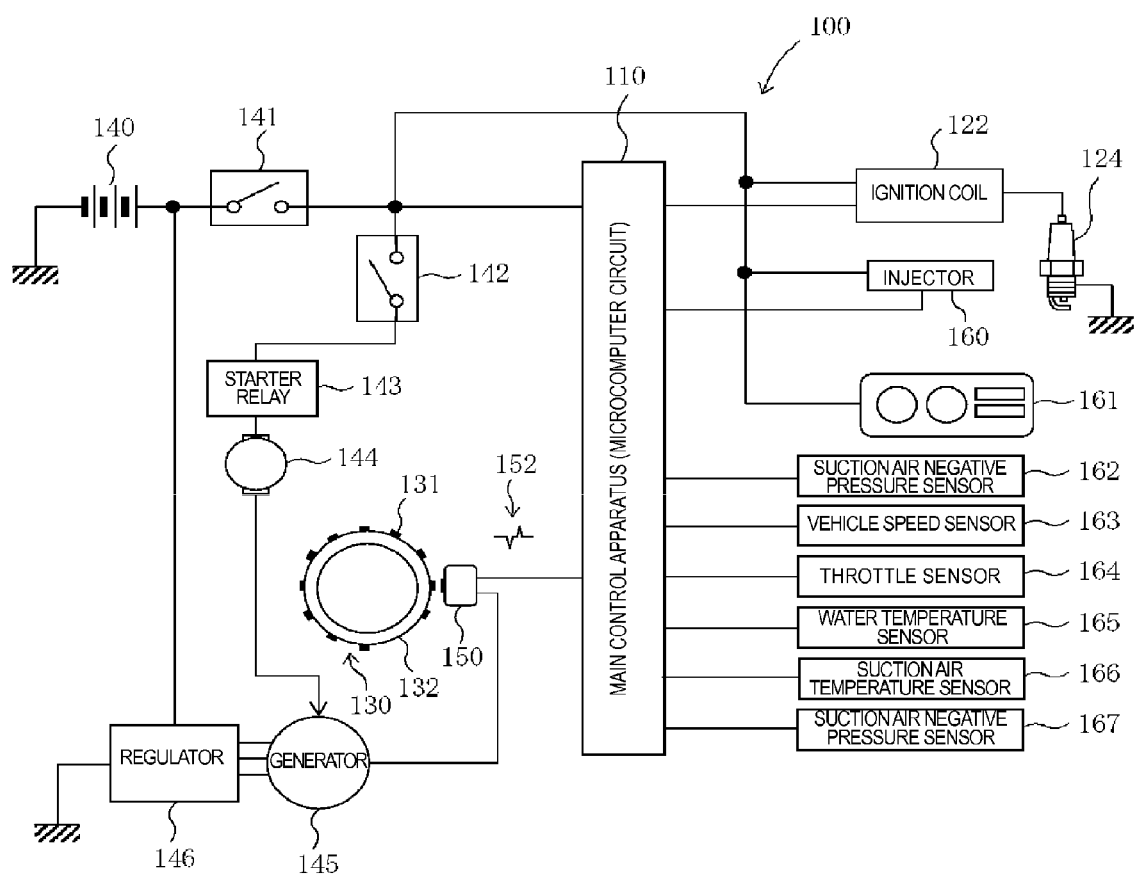
FIG. 13 is a block diagram showing the ignition timing control system.

Next, an example of the ignition timing control system 100 and a related configuration thereof according to the present preferred embodiment will be shown in reference to FIG. 13.

The ignition timing control system 100 shown in FIG. 13 includes a main control apparatus 110 including a microcomputer circuit, the main control apparatus 110 corresponds to the control apparatus 110 shown in FIG. 8, and performs the process shown in FIGS. 10A and 10B, or the process shown in FIG. 11 or FIGS. 12A and 12B. Furthermore, the main control apparatus 110 may be connected to a recording medium (for example, ROM, RAM) including predetermined values of "J1", "K1" stored therein, or the main control apparatus 110 may include such a recording medium.

Figure 4:
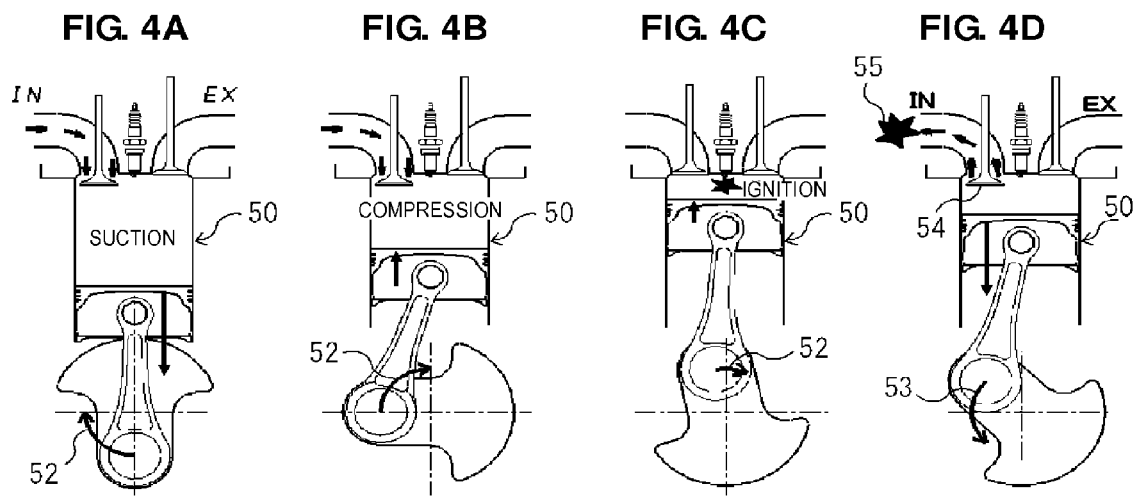
FIGS. 4A through 4D are sectional views of strokes of an engine for explaining a situation in which kickback occurs.

The main control apparatus 110 is connected to an ignition coil 122, and the ignition coil 122 is connected to an ignition plug 124. The ignition coil 122 and the ignition plug 124 define the ignition apparatus 120 shown in FIG. 8. Furthermore, the ignition plug 124 is also illustrated in FIG. 4.

The main control apparatus 110 is also connected to the pulser 150. The pulser 150 is combined with the AC generator 130 having the plurality of projections 131, the pulse signal 152 is generated thereby, and the pulse signal 152 is processed by the main control apparatus 110. The AC generator 130 is connected to the crankshaft (not illustrated) of the engine.

The pulser 150 is connected to a generator 145, and the generator 145 is connected to a battery 140 via a regulator 146. The battery 140 is connected to the ignition coil 122, an injector 160, the main control apparatus 110, and a starter switch 142 via a main switch 141. The starter switch 142 is connected to a starter 144 via a starter relay 143, and the starter 144 is connected to the generator 145.

Furthermore, in this example, the main control apparatus 110 is connected to the injector 160 for spraying fuel, and is connected to an electronic meter 161, a suction negative pressure sensor 162, a vehicle speed sensor 163, a throttle sensor 164, a water temperature sensor 165, a suction air temperature sensor 166, and a suction negative pressure sensor 167.

Figure 14:
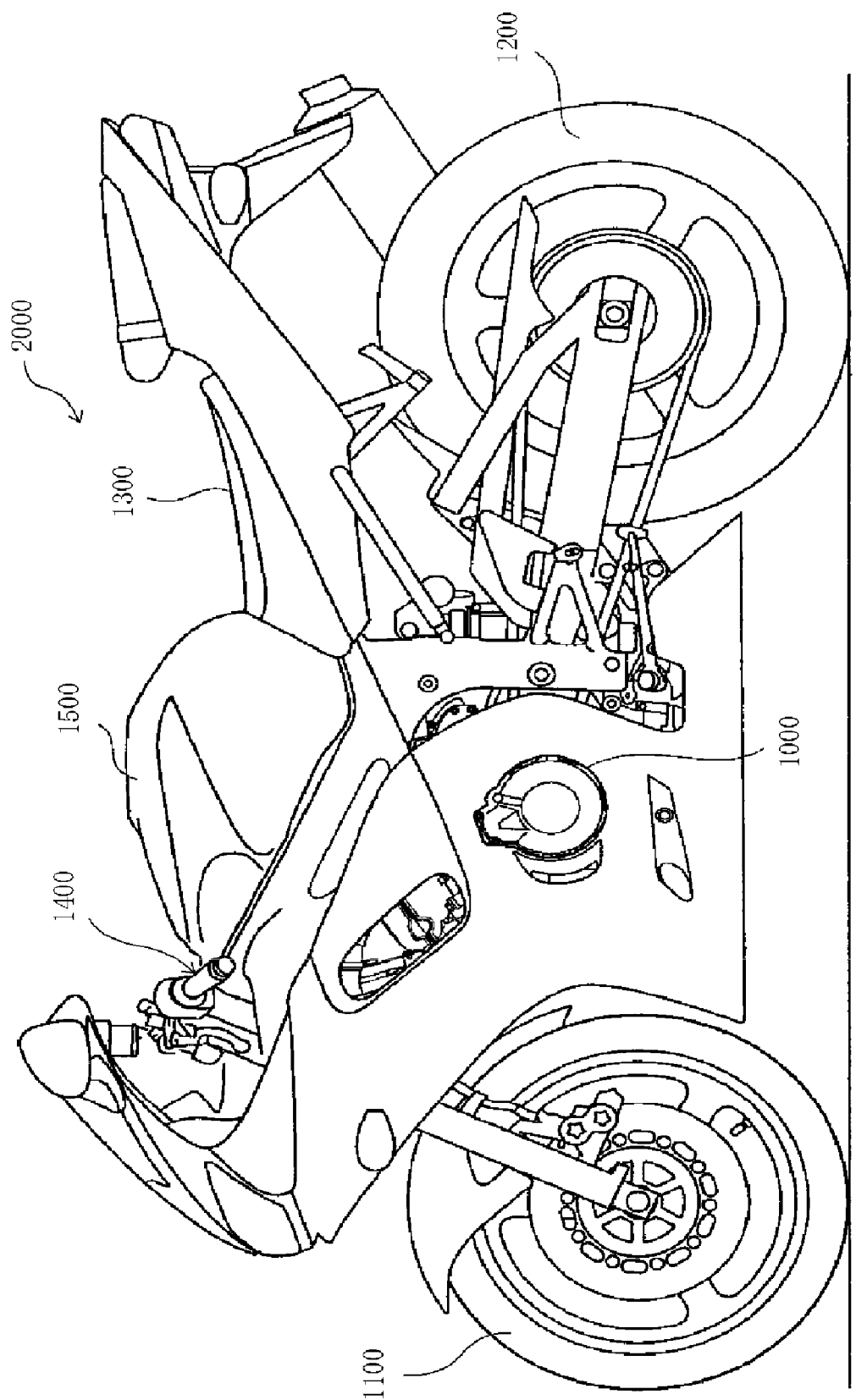
FIG. 14 is a side view showing a riding type vehicle (motorcycle) according to a preferred embodiment of the present invention.

The internal combustion engine (engine) 1000 including the ignition timing control system 100 of the present preferred embodiment is mounted to, for example, a motorcycle 2000 shown in FIG. 14. The motorcycle 2000 shown in FIG. 14 is an on road type motorcycle, and includes a rear wheel 1200 which is rotated as a result of the respective strokes of the internal combustion engine 1000 and a front wheel 1100 which is moved by the operation of a handle 1400. One side of the handle 1400 is provided with a throttle (not illustrated), and an explanation of operation of the opening degree of the throttle and operation of the internal combustion engine 1000 is described above. Furthermore, the internal combustion engine 1000 is supplied with fuel stored in a fuel tank 1500 and a seat 1300, on which a rider is seated, is arranged on a rear side of the fuel tank 1500.

Although the motorcycle 2000 shown in FIG. 14 is an on road type, the present invention is not limited thereto, and is also applicable to an off road type motorcycle. Furthermore, "automatic two wheel vehicle" in the specification signifies a motorcycle, and includes a bicycle with a prime mover (motor bike), a scooter, and specifically refers to a vehicle that is turnable by inclining a vehicle body. Therefore, a three wheel vehicle, or a four wheel vehicle (or more wheel vehicle) which have at least one front wheel and at least one rear wheel are vehicles included in the term "automatic two wheel vehicle".

Figure 15:
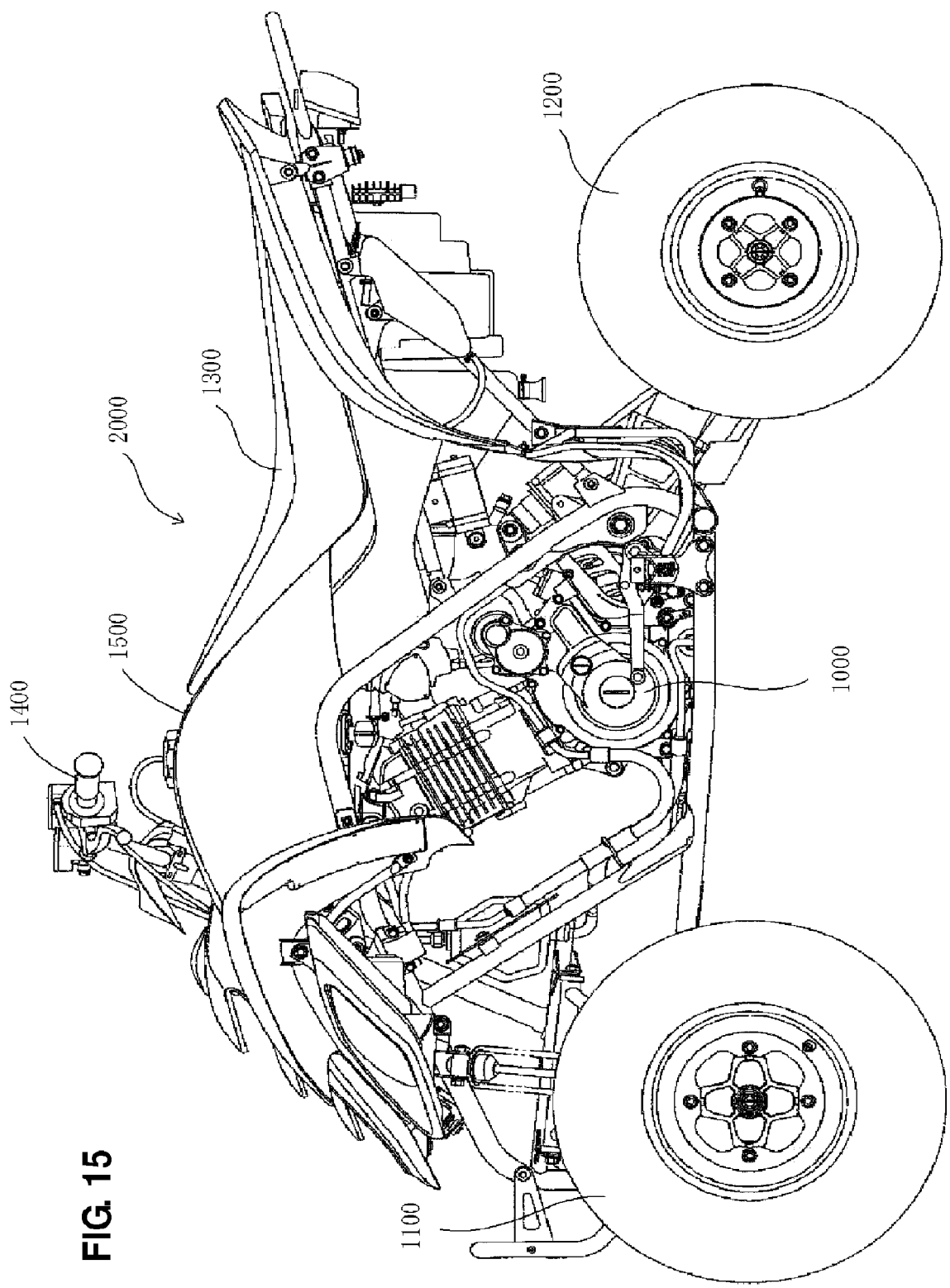
FIG. 15 is a side view showing a riding type vehicle (four wheel buggy) according to a preferred embodiment of the present invention.

Furthermore, the present invention is not limited to a motorcycle but is also applicable to other vehicles that are capable of utilizing the advantages of various preferred embodiments of the present invention. For example, other than a motorcycle, the present invention is applicable to a riding type vehicle including a four wheel buggy (ATV: All Terrain Vehicle) 2000 shown in FIG. 15, a snow mobile, and another other riding type vehicle.

Although, as described above, the present invention has been explained with reference to preferred embodiments, the present invention is not limited thereto, and can be modified or changed variously. For example, although according to the preferred embodiments described above, an explanation has been given of an example of determining whether ignition will produce ignition combustion kickback and performing a hard ignition or an ignition at an angle which is delayed more than the hard ignition based on the determination, as long as ignition combustion kickback can be effectively prevented, even when the angle is more advanced than at a hard ignition, the ignition combustion kickback restraining operation can also be performed at an ignition timing at an angle which is delayed more than the ignition timing of the internal combustion engine immediately therebefore.

Furthermore, when a soft ignition is used, the ignition timing can be set more arbitrarily than when using a hard ignition, and therefore, an advance angle amount and a delay angle amount can be freely set such that the ignition timing can be controlled finely or optimally based on a degree of producing kickback determined by the control apparatus. As a result, a rider can operate the motorcycle without experiencing a strange feeling.

According to the present invention, kickback can be effectively prevented not only during starting but also in all rotation regions, and therefore, a riding type vehicle having a reduced cost and weight is provided.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An internal combustion engine for performing an ignition timing control by an electronic control to provide a previously determined ignition timing in accordance with a pulse signal from a pulser;
   wherein the pulser generates a plurality of the pulse signals per one rotation of the internal combustion engine, the internal combustion engine comprising:

an ignition timing control system that is operative to calculate a reduction amount of a rotational speed of the internal combustion engine using the plurality of pulse signals immediately before performing an ignition at the previously determined ignition timing in the internal combustion engine to determine whether the reduction amount produces ignition combustion kickback and to perform a hard ignition or an ignition at an angle which is delayed more than the hard ignition based on the determination.

2. The internal combustion engine according to claim 1, wherein the ignition timing control system comprises:
    a control apparatus connected to the pulser and arranged to calculate the reduction amount of the rotational speed; and
    an ignition apparatus connected to the control apparatus and the ignition timing of which is controlled by the control apparatus; wherein
    the control apparatus calculates the reduction amount of the rotational speed and determines whether the reduction amount of the rotational speed produces the ignition combustion kickback.

3. The internal combustion engine according to claim 1, wherein the internal combustion engine is an internal combustion engine for a riding type vehicle.

4. A vehicle including the internal combustion engine according to claim 1.

5. The internal combustion engine according to claim 1, wherein the ignition timing control system determines whether the reduction in the rotational speed produces the ignition combustion kickback, determines a degree to which the ignition combustion kickback is produced, executes the hard ignition when the degree is determined to be relatively small, and executes the delay angle ignition when the degree is determined to be relatively large.

6. The internal combustion engine according to claim 5, wherein the ignition timing control system performs ignition stopping when the degree to which the ignition combustion kickback is produced is determined to be relatively large in the delay angle ignition.

7. An internal combustion engine for performing an ignition timing control by an electronic control to provide a previously determined ignition timing in accordance with a pulse signal from a pulser;
    wherein the pulser generates a plurality of the pulse signals per one rotation of the internal combustion engine, the internal combustion engine comprising:
    an ignition timing control system that is operative to calculate a rotational speed of the internal combustion engine using a plurality of the pulse signals immediately before performing an ignition at the previously determined ignition timing in the internal combustion engine, determine whether when the rotational speed is less than a constant value, the rotational speed produces ignition combustion kickback, and perform a hard ignition or a delayed angle ignition based on the determination.

8. The internal combustion engine according to claim 7, wherein the ignition timing control system comprises:
    a control apparatus connected to the pulser and arranged to calculate the rotational speed of the internal combustion engine and determine whether a value of the rotational speed is less than the constant value; and
    an ignition apparatus which is connected to the control apparatus and the ignition timing of which is controlled by the control apparatus; wherein
    the control apparatus determines whether when the value of the rotational speed is less than the constant value, the value produces the ignition combustion kickback.

9. The internal combustion engine according to claim 7, wherein the internal combustion engine is an internal combustion engine for a riding type vehicle.

10. A vehicle including the internal combustion engine according to claim 7.

11. An internal combustion engine for performing an ignition timing control by an electronic control to provide a previously determined ignition timing in accordance with a pulse signal from a pulser;
    wherein the pulser generates a plurality of the pulse signals per one rotation of the internal combustion engine, the internal combustion engine comprising:
    an ignition timing control system that is operative to control an occurrence of ignition combustion kickback by calculating a reduction amount of a rotational speed of the internal combustion engine using a plurality of the pulse signals immediately before performing an ignition at the previously determined ignition timing in the internal combustion engine;
    wherein the ignition timing control system performs an ignition at an angle which is delayed more than the ignition of the internal combustion engine immediately therebefore in accordance with a level of the reduction amount of the rotational speed.

12. The internal combustion engine according to claim 11, wherein the delayed angle ignition includes a hard ignition and an ignition an angle of which is delayed more than the hard ignition.

13. The internal combustion engine according to claim 11, wherein the ignition timing control system performs ignition stopping.

14. The internal combustion engine according to claim 11, wherein the ignition timing control system is operated in all rotation regions of the internal combustion engine to control the occurrence of the ignition combustion kickback.

15. The internal combustion engine according to claim 11, wherein the internal combustion engine is an internal combustion engine for a riding type vehicle.

16. A vehicle including the internal combustion engine according to claim 11.

* * * * *